United States Patent
Jin et al.

(10) Patent No.: US 9,080,059 B2
(45) Date of Patent: *Jul. 14, 2015

(54) COATING COMPOSITIONS

(75) Inventors: Xin Jin, Lake Jackson, TX (US); Ray E. Drumright, Midland, MI (US); Bernhard Kainz, Lauf (DE); Jerry E. White, Lake Jackson, TX (US); Robert E. Hefner, Jr., Rosharon, TX (US)

(73) Assignee: Blue Cube IP LLC, Midland, MI (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/817,015

(22) PCT Filed: Sep. 13, 2011

(86) PCT No.: PCT/US2011/051291
§ 371 (c)(1),
(2), (4) Date: Feb. 14, 2013

(87) PCT Pub. No.: WO2012/044455
PCT Pub. Date: Apr. 5, 2012

(65) Prior Publication Data
US 2013/0143982 A1  Jun. 6, 2013

Related U.S. Application Data

(60) Provisional application No. 61/388,077, filed on Sep. 30, 2010.

(51) Int. Cl.
| | |
|---|---|
| *B32B 15/092* | (2006.01) |
| *B32B 27/38* | (2006.01) |
| *C09D 163/00* | (2006.01) |
| *C08G 59/24* | (2006.01) |
| *B05D 3/02* | (2006.01) |
| *C09D 5/00* | (2006.01) |
| *C08G 59/06* | (2006.01) |

(52) U.S. Cl.
CPC ............... *C09D 5/00* (2013.01); *C08G 59/066* (2013.01); *C09D 163/00* (2013.01); *C08L 2205/05* (2013.01)

(58) Field of Classification Search
None
See application file for complete search history.

(56) References Cited

U.S. PATENT DOCUMENTS

| | | |
|---|---|---|
| 3,256,226 A | 6/1966 | Fekete et al. |
| 3,271,363 A | 9/1966 | Nikles et al. |
| 3,639,655 A | 2/1972 | Jones |
| 3,864,316 A | 2/1975 | Robinson |
| 4,125,558 A | 11/1978 | Torsi |
| 4,284,574 A | 8/1981 | Bagga |
| 4,373,073 A | 2/1983 | Wojtech et al. |
| 4,417,033 A | 11/1983 | Bowditch |
| 4,544,731 A | 10/1985 | Cavitt et al. |
| 4,638,020 A * | 1/1987 | Christenson et al. ......... 523/406 |
| 4,880,892 A * | 11/1989 | Urano et al. ..................... 528/89 |
| 5,128,491 A | 7/1992 | Cheng |
| 5,780,582 A | 7/1998 | Wang et al. |

(Continued)

FOREIGN PATENT DOCUMENTS

| | | |
|---|---|---|
| EP | 0253405 A2 | 1/1988 |
| EP | 0702042 A1 | 3/1996 |

(Continued)

OTHER PUBLICATIONS

PCT US2011050742, International Preliminary Report on Patentability, (2013).
PCTUS2011049840, International Preliminary Report on Patentability, (2013).
PCTUS2011049840, International Search Report, (2012).
PCTUS2011049840, Written Opinion of the International Searching Authority.
PCTUS2011050597, International Search Report, (2012).
PCTUS2011050597, Written Opinion of the International Searching Authority.

(Continued)

*Primary Examiner* — Michael J Feely

(57) ABSTRACT

A coating composition comprising an advanced epoxy resin polymeric composition having the following chemical structure:(formula) I where n is a number from 1 to about 3000; each m independently has a value of 0 or 1; each R0 is independently —H or —$CH_3$; each $R^1$ is independently —H or a $C_1$ to $C_6$ alkylene radical (saturated divalent aliphatic hydrocarbon radical); $R'_1$-$R'_4$ are independently hydrogen, an alkyl, cycloalkyl, an aryl or an aralkyl group or other substituent, for example, a nitro, an isocyanate, or an alkyloxy group; additionally, any two of $R'_1$-$R'_4$ may form fused ring independently; and X is cycloalkylene group, including substituted cycloalkylene group, where the substituent groups include an alkyl, cycloalkyl, an aryl or an aralkyl group or other substituent group, for example, a halide, a cyano, a nitro, a blocked isocyanate, or an alkyloxy group; the combination of cycloalkylene and alkylene groups and the combination of alkylene and cycloalkylene group with a bridging moiety in between.

(I)

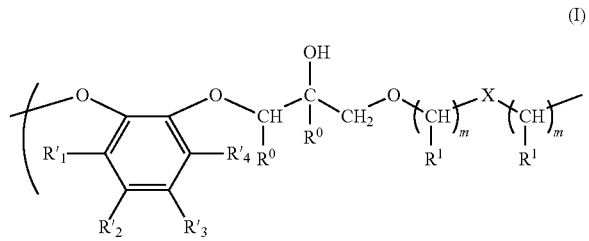

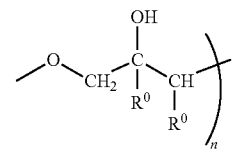

15 Claims, No Drawings

(56) References Cited

U.S. PATENT DOCUMENTS

| | | |
|---|---|---|
| 5,959,061 A | 9/1999 | Neumann et al. |
| 6,211,389 B1 | 4/2001 | Dimke |
| 6,410,807 B1 | 6/2002 | Yang et al. |
| 6,677,468 B1 | 1/2004 | Dimke et al. |
| 8,318,834 B2 | 11/2012 | Hefner, Jr. et al. |
| 2002/0161106 A1 | 10/2002 | Anderson |
| 2006/0235183 A1 | 10/2006 | Ogura et al. |
| 2007/0087146 A1 | 4/2007 | Evans et al. |
| 2007/0117938 A1 | 5/2007 | Martz et al. |
| 2007/0281179 A1 | 12/2007 | Ambrose et al. |
| 2011/0039982 A1 | 2/2011 | Hefner, Jr. et al. |
| 2011/0040046 A1 | 2/2011 | Hefner, Jr. et al. |
| 2011/0054056 A1 | 3/2011 | Hefner, Jr. et al. |
| 2013/0178590 A1* | 7/2013 | Jin et al. .................. 525/418 |

FOREIGN PATENT DOCUMENTS

| | | |
|---|---|---|
| GB | 120476 A | 11/1918 |
| JP | 200700915 | 1/2007 |
| WO | 9510556 A1 | 4/1995 |
| WO | 0001779 A1 | 1/2000 |
| WO | 03078512 A1 | 9/2003 |
| WO | 2007/078859 A2 | 7/2007 |
| WO | 2008045882 A1 | 4/2008 |
| WO | 2008045884 A1 | 4/2008 |
| WO | 2008045889 A1 | 4/2008 |
| WO | 2008045894 A1 | 4/2008 |
| WO | 2009/105938 A1 | 9/2009 |
| WO | 2009142898 A1 | 11/2009 |
| WO | 2009142900 A1 | 11/2009 |
| WO | 2009142901 A1 | 11/2009 |
| WO | 2012/044443 A1 | 4/2012 |
| WO | 2012/044455 A1 | 4/2012 |
| WO | 2012/050777 A1 | 4/2012 |
| WO | 2012044458 A1 | 4/2012 |

OTHER PUBLICATIONS

PCTUS2011050613, International Preliminary Report on Patentability, (2013).
PCTUS2011050613, International Search Report and Written Opinion, (2012).
PCTUS2011050742, International Search Report and Written Opinion of the International Searching Authority, (2012).
PCTUS2011051291, International Preliminary Report on Patentability, (2013).
PCTUS2011051291, International Search Report, (2011).
PCTUS2011051291, Written Opinion of the International Searching Authority.
PCTUS2011051482, International Preliminary Report on Patentability, (2013).
PCTUS2011051482, International Search Report and Written Opinion of the International Searching Authority, (2011).
PCTUS2011052236 International Preliminary Report on Patentability, (2013).
PCTUS2011052236 International Search Report and Written Opinion of the International Searching Authority, (2011).
PCTUS2011052672, International Preliminary Report on Patentability, (2013).
PCTUS2011052672, International Search Report, (2011).
PCTUS2011052672, Written Opinion of the International Searching Authority.
Dean, J.M., et al., Journal of Polymer Science, Part B: Polymer Physics, 2001, pp. 2996-3010, vol. 39.
Taira, Kazunari, et al., Journal of the American Chemical Society, Jun. 8, 1984, 7831-7835, V. 106.
U.S. Appl. No. 61/157,380.
U.S. Appl. No. 61/388,059.
White, S.R., et al, Nature, Autonomic Healing of Polymer Composites, 2001, pp. 409-794.

* cited by examiner

COATING COMPOSITIONS

This application is a national stage (371) application of PCT/US11/51291 (filed Sep. 13, 2011), which claims priority to U.S. Provisional Patent Application No. 61/388,077 (filed on Sep. 30, 2010), the teachings of which are incorporated by reference herein, as if reproduced in full herein below.

BACKGROUND OF THE INVENTION

1. Field of the Invention

The present invention relates to coating compositions prepared from an advanced epoxy resin composition which has been prepared from a reaction mixture comprising catechol and cycloaliphatic diglycidyl ether compounds. The coating compositions are useful, for example, as internal and external protective coating compositions for cans and other metal food and beverage packaging coatings.

2. Description of Background and Related Art

Epoxy resins are widely used in coating compositions of the interior and exterior surfaces of food and beverage containers because they provide a unique property combination of excellent resistance to chemicals, reasonable flexibility, resistance to hydrolysis, blush, corrosive food and beverages, having good thermal stability as well as inertness to taste or odor changes. A variety of manufacturing processes are used to apply such coatings to substrates. Flexibility and adhesion are essential because the coating should remain intact during the can formation process when the coated flat metal sheet is drawn into the form of the can. However, the bisphenol A based high molecular weight epoxy resins commonly used in can coating application have limited flexibility and toughness at room temperature. The elongation to break of bisphenol A based epoxy resins at room temperature is known to be poor. The toughness deficiency is an issue in certain applications, for example pre-coat post-form applications. Higher temperature is used in some can formation processing to compensate for the relatively low flexibility of the incumbent epoxy resin coatings.

Retort resistance is another beneficial property for can coating compositions. When the cans are filled with food, the contents are usually sterilized by heating the sealed can to temperatures of around 120-130° C. for about 1 to 2 hours, depending on the nature of the food contents. The coating is then in direct contact with the food contents for a considerable period of time, for example many years. During the sterilization and subsequent storage, the coating maintains its integrity so as to prevent corrosion of the metal can and to prevent metal migration and migration from fragmented species of the coatings into the can contents. Trends in the industry for improved flexibility in coatings without compromising retort resistance of coatings is open for alternative coating compositions meeting these technical challenges.

SUMMARY OF THE INVENTION

One embodiment of the present invention is directed to a curable coating composition comprising an advanced epoxy resin polymeric composition having the following chemical Structure (I):

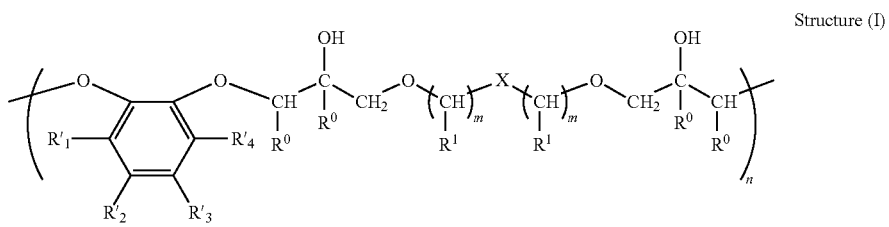

where n is a number from 1 to about 3000; each m independently has a value of 0 or 1; each $R^0$ is independently —H or —$CH_3$; each $R^1$ is independently —H or a $C_1$ to $C_6$ alkylene radical (saturated divalent aliphatic hydrocarbon radical); $R'_1$-$R'_4$ are independently hydrogen, an alkyl, cycloalkyl, an aryl or an aralkyl group or other substituent, for example, a halide, a cyano, a nitro, a blocked isocyanate, or an alkyloxy group; additionally, any two of $R'_1$-$R'_4$ may form a fused ring independently; and X is cycloalkylene group, including substituted cycloalkylene group, wherein the substituent groups include an alkyl, cycloalkyl, an aryl or an aralkyl group or other substituent group, for example, a nitro, a blocked isocyanate, or an alkyloxy group; the combination of cycloalkylene and alkylene groups and the combination of alkylene and cycloalkylene group with a bridging moiety in between.

Another embodiment of the present invention includes wherein the above curable advanced epoxy resin coating composition comprises (i) the above advanced epoxy resin of Structure (I); (ii) at least one curing agent; (iii) optionally, at least one curing catalyst; (iv) optionally, at least one solvent and (v) optionally, at least one additive.

In one preferred embodiment, it has been found that cycloaliphatic diglycidyl ether compounds and catechol can be successfully used to make substantially linear high molecular weight epoxy resin products, which have a high level of elongation at break and high tensile toughness and can be advantageously used in preparing the above curable composition.

Still another embodiment of the present invention is directed to a cured coating prepared by curing the above curable coating composition.

The present invention provides a coating and a method for preparing a coating having unusually high flexibility, good retort resistance, and excellent adhesion before and after retorting processes, good organic solvent resistance and good visual blush appearance useful for metal food and beverage packaging applications.

The coating of the present invention can be used in various coating applications such as for making can coatings, wherein high flexibility, good retort resistance, and excellent adhesion to the metal before and after retorting processes are desired, particularly when the can coating will be used for metal food packaging applications. The present invention advantageously provides a coating composition with improved flexibility without negatively impacting other coating properties, such as adhesion to substrates, solvent resistance, and retort resistance.

The flexibility of the cured coating compositions comprising the advanced high molecular weight epoxy resin of the present invention was demonstrated by Wedge Bend Flexibility measurement, its solvent resistance was characterized by Methyl Ethyl Ketone (MEK) Double Rub Test, and its retort resistance and stable adhesion during the retort process was characterized by retort measurement in lactic acid solution. The Wedge Bend Flexibility results indicate that the cured coating compositions comprising the advanced high molecular weight epoxy resin of the present invention are more flexible than the cured bisphenol A based high molecular weight 9-type epoxy resin. MEK Double Rub results and retort resistance measurement illustrate that the cured coating compositions comprising the advanced high molecular weight epoxy resin of the present invention provide good chemical solvent resistance and retort resistance similar to the cured coating compositions of the bisphenol A based high molecular weight epoxy resin.

DETAILED DESCRIPTION OF THE INVENTION

One broad embodiment of the present invention relates to coating compositions employing novel high molecular weight epoxy resins based on the reaction product of cycloaliphatic diglycidyl ether and aromatic diols. More particularly, the coating composition of the present invention includes substantially linear high molecular weight epoxy resins with a high level of elongation at break and high tensile toughness which improve coating performance during and after coating and coating deformation processes. For example, the epoxy resins useful in the coating composition of the present invention may comprise a reaction product of (a) a cycloaliphatic diglycidyl ether (DGE) and (b) an aromatic diol such as catechol, a substituted catechol, or mixtures thereof.

The cured coating exhibits improved flexibility without negative impact on other coating properties, such as adhesion to substrates, as well as solvent and retort resistances.

The curable coating composition of the present invention includes, as a first component, an advanced epoxy resin having the following chemical Structure (I):

stituted cycloalkylene group, where the substituent groups include an alkyl, cycloalkyl, an aryl or an aralkyl group or other substituent group, for example, a nitro, a blocked isocyanate, or an alkyloxy group; the combination of cycloalkylene and alkylene groups and the combination of alkylene and cycloalkylene group with a bridging moiety in between.

In one embodiment, the average number of repeating units, n shown in above Structure I, is preferably a number from 1 to about 3000, more preferably a number from 2 to 1500, more preferably a number from about 4 to about 1000, more preferably a number from about 6 to about 500, more preferably a number from about 8 to about 100, and most preferably a number from about 10 to about 50.

In another embodiment, the weight average molecular weight of the first component, the advanced epoxy resin of the present invention, may be above about 300 and typically generally above about 1000, more preferably above about 4000, more preferably above about 5000, and most preferably above about 7000.

In another embodiment, the weight average molecular weight of the first component, the advanced epoxy resin of the present invention, is generally between about 300 to about 1,000,000, preferably from about 1,000 to about 500,000, more preferably from about 2,000 to about 100,000, even more preferably from about 4,000 to about 50,000, still even more preferably from about 5,000 to about 40,000, and most preferably from about 7,000 to about 30,000.

The glass transition temperature of the first component, the advanced epoxy resin of the present invention, is generally between about −50° C. to about 200° C., preferably from about 0° C. to about 150° C., more preferably from about 10° C. to about 120° C., even more preferably from about 20° C. to about 100° C., and most preferably from about 25° C. to about 90° C.

The elongation at break of the first component, the advanced epoxy resin of the present invention, is generally between about 4 percent (%) to about 10000%, preferably from about 10% to about 5000%, more preferably from about 20% to about 2000%, even more preferably from about 30% to about 1500%, still even more preferably from about 40% to about 1200%, and most preferably from about 50% to about 1100%.

The tensile toughness of the first component, the advanced epoxy resin of the present invention, is generally between

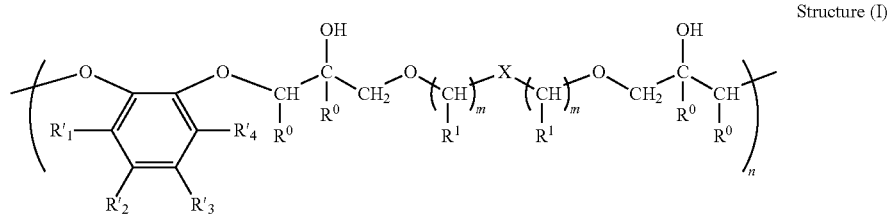

Structure (I)

where n is a number from 1 to about 3000; each m independently has a value of 0 or 1; each $R^0$ is independently —H or —$CH_3$; each $R^1$ is independently —H or a $C_1$ to $C_6$ alkylene radical (saturated divalent aliphatic hydrocarbon radical); $R'_1$-$R'_4$ are independently hydrogen, an alkyl, cycloalkyl, an aryl or an aralkyl group or other substituent, for example, a halide, a cyano, a nitro, a blocked isocyanate, or an alkyloxy group; additionally, any two of $R'_1$-$R'_4$ may form fused ring independently; and X is cycloalkylene group, including subabout 0.05 MPa to about 500 MPa, preferably from about 0.05 MPa to about 500 MPa, more preferably from about 0.1 MPa to about 100 MPa, even more preferably from about 0.5 MPa to about 50 MPa, still even more preferably from about 0.8 MPa to about 30 MPa, and most preferably from about 1 MPa to about 20 MPa.

The advanced epoxy resin composition may comprise a reaction product of (a) cycloaliphatic diglycidyl ether compounds such as a mixture of 1,3 and 1,4 cis and trans cyclohexanedimethanol diglycidyl ether formed during an epoxidation process and (b) catechol, a substituted catechol, or mixtures thereof.

In one embodiment, for example, the preparation of the above advanced epoxy resins useful in the coating compositions may be illustrated by the following reaction Scheme (I):

Scheme (I)

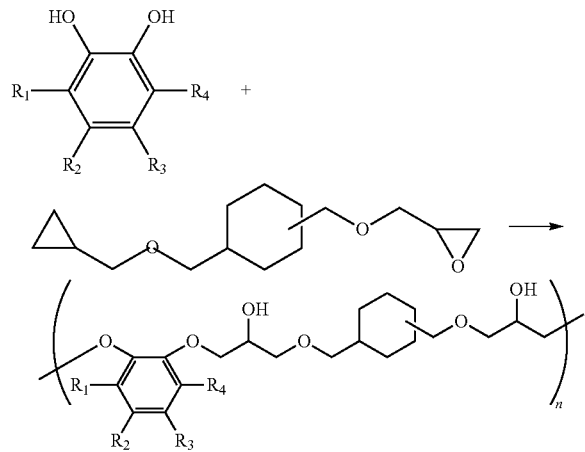

where n is a number from 1 to about 3000; $R'_1$-$R'_4$ are independently hydrogen, an alkyl, cycloalkyl, an aryl or an aralkyl group or other substituent, for example, a halide, a cyano, a nitro, a blocked isocyanate, or an alkyloxy group; additionally, any two of $R'_1$-$R'_4$ may form fused aliphatic or aromatic ring independently; the diepoxide compound may be, for example, a mixture comprising 1,3- and 1,4-cis- and trans-cyclohexanedimethanol diglycidyl ether formed during an epoxidation process of 1,3- and 1,4-cis- and trans-cyclohexanedimethanol or a mixture comprising 1,4-cis- and trans-cyclohexanedimethanol diglycidyl ether formed during an epoxidation process of 1,4-cis- and trans-cyclohexanedimethanol. The resultant advanced high molecular weight epoxy resin product contains ether linkages and hydroxylpropyl backbone groups characteristic of the epoxy resin advancement reaction. Although the advanced epoxy resin illustrated above is a linear chain without branching, it is possible that small amounts of side-reactions may generate branches and/or primary hydroxyl groups along the polymer chains. The substantially linear advanced epoxy resin forms homogeneous coating solutions in suitable coating solvents without any apparent gel particles and/or insoluble fractions.

One preferred example of cycloaliphatic diglycidyl ether of the present invention used to build new high molecular weight epoxy resins is UNOXOL™ Diol DGE, which is a product mixture comprising a diglycidyl ether of cis-1,3-cyclohexanedimethanol, a diglycidyl ether of trans-1,3-cyclohexanedimethanol, a diglycidyl ether of cis-1,4-cyclohexanedimethanol, and a diglycidyl ether of trans-1,4-cyclohexanedimethanol WO2009/142901, incorporated herein by reference, describes an epoxy resin composition comprising such a product mixture and isolation of high purity DGE therefrom.

[UNOXOL™ cyclic dialcohol is a registered trademark of the Union Carbide Corporation.]

Another preferred example of cycloaliphatic diglycidyl ether to build new high molecular weight epoxy resins in the present invention is a mixture comprising diglycidyl ether of cis-1,4-cyclohexanedimethanol, a diglycidyl ether of trans-1, 4-cyclohexanedimethanol, and a product mixture thereof.

In general, the aliphatic or cycloaliphatic epoxy resin used to prepare a diglycidyl ether reactant, component (a), for use in the advancement reaction of the present invention is prepared by a process (e.g. an epoxidation reaction) comprising reacting (1) an aliphatic or cycloaliphatic hydroxyl-containing material with (2) an epihalohydrin, and (3) a basic acting substance in the presence of (4) a catalyst. The process may optionally comprise (5) a solvent which is substantially inert to reaction with the reactants employed, the intermediates formed and the epoxy resin product produced. The catalyst is preferably a non-Lewis acid catalyst. Said process typically comprises the steps of (a) coupling of the epihalohydrin with the aliphatic or cycloaliphatic hydroxyl-containing material and (b) dehydrohalogenation of the intermediate halohydrin thus formed. The process may be, for example, a phase transfer catalyzed epoxidation process, a slurry epoxidation process, or an anhydrous epoxidation process. A detailed description of the aliphatic or cycloaliphatic epoxy resin and the processes for preparing the same is provided in WO/2009/142901, which is incorporated herein by reference.

Aliphatic or cycloaliphatic hydroxyl-containing materials, component (1), which may be employed in the epoxidation process of the present invention may include for example any one or more of the following: (A) cyclohexanedialkanols and cyclohexenedialkanols such as UNOXOL™ Diol (cis-, trans-1,3- and 1,4-cyclohexane-dimethanol) as a preferred cyclohexanedialkanol; (B) cyclohexanolmonoalkanols and cyclohexenolmonoalkanols, such as trans-2-(hydroxymethyl)cyclohexanol or 1-phenyl-cis-2-hydroxymethyl-r-1-cyclohexanol; (C) decahydronaphthalenedialkanols, octahydronaphthalenedialkanols and 1,2,3,4-tetrahydronaphthalenedialkanols, such as 1,2-decahydronaphthalenedimethanol; (D) bicyclohexanedialkanols or bicyclohexanol-monoalkanols, such as bicyclohexane-4,4'-dimethanol; (E) bridged cyclohexanols, such as hydrogenated bisphenol A (4,4'-isopropylidenediphenol); (F) other cycloaliphatic and polycycloaliphatic diols, monol monoalkanols, or dialkanols such as, cyclopentane-1,3-diol; or (G) aliphatic hydroxyl-containing materials such as alkoxylated phenolic reactants; as described in pages 6 to 13 of co-pending U.S. Patent Application Ser. No. 61/388,071, entitled "ADVANCED EPOXY RESIN COMPOSITIONS", filed of even date herewith by Xin Jin et al., such pages incorporated herein by reference.

The epichlorohydrin, component (2); the basic acting substance, component (3); the non-Lewis acid catalyst, component (4); and the optional solvent, component (5) useful in the present invention may be selected from the same components as described in pages 13 to 16 of co-pending U.S. Patent Application Ser. No. 61/388,071, such pages incorporated herein by reference.

Epoxy resins of cycloaliphatic or polycycloaliphatic diols may beneficially be employed in a mixture with one or more of the epoxy resins selected from the epoxy resins prepared from aliphatic or cycloaliphatic hydroxyl-containing materials described above to provide additional advanced high molecular weight epoxy resin compositions of the present invention. Epoxy resins of other kinds of diols may also beneficially be employed in a mixture comprising one or more of the epoxy resins selected from the epoxy resins of aliphatic or cycloaliphatic hydroxyl-containing materials described above to provide additional advanced high molecular weight epoxy resin compositions of the present invention.

Epoxy resins prepared from reaction of aliphatic and cycloaliphatic diols using non-Lewis acid processes typically contain a significant amount of oligomeric product with an epoxide functionality of greater than 2. Because of the presence of functionality higher than 2 epoxide groups per molecule, an excess of these oligomers can induce unwanted branching, excessive viscosity, premature crosslinking or gelation. Thus, the epoxy resins used to prepare the compositions of the present invention should have an amount of diglycidyl ether component which allows the advancement reaction to progress to completion without the aforementioned problems. Thus, the amount of oligomer content in the epoxy resin is generally from 0 wt % to about 10 wt %, preferably from 0.01 wt % to about 5 wt % and more preferably from 0 wt % to about 0.5 wt %.

Monoglycidyl monol ethers may also comprise a component of the epoxy resins used to prepare the compositions of the present invention. Because the monoglycidyl ether component generally functions as a chain terminator in the advancement reaction, it is present in an amount which does not hinder the desired extent of molecular weight build and other such properties. Thus, the amount of oligomer content in the epoxy resin is generally from 0 wt % to about 20 wt %, preferably 0.01 wt % to about 10 wt % and more preferably from 0.1 wt % to about 5 wt %.

The diphenols useful as component (b) in the advancement reaction to produce the advanced epoxy resin product of the present invention may comprise ortho-diphenols having the following general structure:

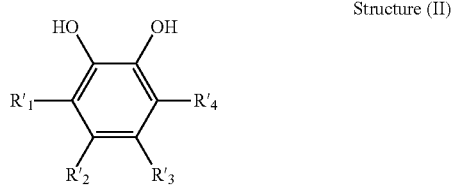

Structure (II)

wherein $R'_1$-$R'_4$ are independently hydrogen, an alkyl, cycloalkyl, an aryl or an aralkyl group or other substituent, for example, for example, a halide, a cyano, a nitro, a blocked isocyanate, or an alkyloxy group. Any two of those $R'_1$-$R'_4$ groups may be fused together to form new aliphatic or aromatic rings.

The ortho-diphenol compounds useful in the present invention may comprise any substituted or unsubstituted aromatic structures with two hydroxyl groups in ortho-ring positions. The aryl structures may comprise for example benzene, substituted benzene and ring-annulated benzene, or the combination of aryl and aliphatic substitute groups.

The diphenol useful in the present invention may comprise, but is not limited to, catechol, a substituted catechol, an ortho-dihydroxynapthalene, a substituted ortho-dihydroxynapthalene, and any aromatic compound with two hydroxyl groups in ortho-ring positions.

The monomer molar ratios between the diphenol and the cycloaliphatic diglycidyl ether compounds, such as a mixture of 1,3 and 1,4 cis and trans cyclohexane-dimethanol diglycidyl ether (e.g. UNOXOL™ Diol DGE) may vary from about 5:1 to about 1:5, preferably from about 1:1.5 to about 1.5:1, and more preferably from about 1:1.1 to about 1.1:1. The monomer molar ratios are used to obtain high molecular weight advanced epoxy resins. As described in polymer textbooks, such as George Odian in *Principles of Polymerization*, 4th edition, incorporated herein by reference, a near stoichiometric monomer ratio, e.g. molar ratio between diphenol and cycloaliphatic diglycidyl ether from about 1.1:1 to about 1:1.1, is used to prepare substantially linear high molecular weight epoxy resins. A significant deviation from stoichiometric monomer ratio would lead to oligomers or low molecular weight epoxy products.

In another embodiment of the present invention, diphenol may beneficially be employed in a mixture comprising an ortho-diphenol and one or more diphenols selected from any substituted or unsubstituted aryl structures bearing two hydroxyl groups in any ring positions, where the aryl structures may comprise for example benzene, substituted benzene and ring-annulated benzene, or the combination of aryl and aliphatic substituent groups, to provide additional advanced high molecular weight epoxy resin compositions of the present invention. This method beneficially allows for incorporation of different structures into the advanced high molecular weight epoxy resin compositions as well as control of the polymeric properties and improvement of coating performance.

In another embodiment of the present invention, use of a mixture comprising diphenol selected from any substituted or unsubstituted aryl structures bearing two hydroxyl groups in any ring positions can be employed to provide a reactive epoxy terminated oligomeric product, either in situ or in a separate reaction, which can then be further reacted with ortho-diphenol to give an advancement product of high molecular weight epoxy resin of the present invention. In another embodiment of the present invention, use of a ortho-diphenol can be employed to provide a reactive epoxy terminated oligomeric product, either in situ or in a separate reaction, which can then be further reacted with a mixture comprising diphenols selected from any substituted or unsubstituted aryl structures bearing two hydroxyl groups in any ring positions to give an advancement product of high molecular weight epoxy resin of the present invention.

In another embodiment of the present invention, use of a reactant with moieties possessing different reactivity toward the epoxide group can be employed to provide a reactive oligomeric product, either in situ or in a separate reaction, which can then be further reacted to give an advancement reaction product of the present invention. Then this reactive oligomeric product can be further reacted with the same or different reactants to produce an advanced epoxy resin product of the present invention.

As a representative example, a monophenolmonocarboxylic acid may be reacted with an epoxy resin under conditions which substantially favor reaction of the carboxylic acid moiety leaving the phenolic hydroxyl moiety substantially unreacted. The resultant phenolic hydroxyl terminated product may then be reacted with an additional epoxy resin or an additional epoxy resin plus additional mixture comprising ortho-diphenol to produce the advancement product of the present invention. As another representative example, an aromatic dicarboxylic acid may be reacted with an epoxy resin to produce an epoxy terminated oligomer product. The resultant epoxy terminated oligomer product may then be reacted with an additional ortho-diphenol or an additional epoxy resin plus additional mixture comprising ortho-diphenol to produce the advancement high molecular weight epoxy resin of the present invention. This method beneficially allows for incorporation of different structures into the product as well as control of the position of various chemical structures within the product.

In another embodiment of the present invention, use of a reactant with moieties possessing reactivity toward the epoxide end groups of epoxy resin or hydroxyl group along the polymer chain can be employed to modify the chemical structures of the high molecular weight epoxy resin. It is also possible to incorporate one or more monomers with functional groups other than phenol and epoxide directly into the synthesis of the epoxy resin to modify the chemical structures of epoxy resins. The modified epoxy resin products in the manner given above may possess enhanced physical and/or mechanical properties useful for various applications such as for can coating resins prepared therefrom. Thus, modification of properties such as adhesion to a metal substrate, toughness, processability, and other improved properties may be achieved.

The examples of polymer modifications include, but are not limited to, capping of the epoxy resin with unsaturated acid monomers such as acrylic acids for radiation curing applications, and making water dispersible resins for use in waterborne spray and roller coat applications for beverage and food cans. For example the resin may be made water dispersible as follows: (i) by adding water dispersible acrylic or polyester resins, (ii) by extending the epoxy resin with water dispersible acrylic or polyester resins, (iii) by grafting with acid functional monomers which contain a double bond which is polymerizable by free radical mechanism such as (meth) acrylic acid and vinylic monomers not containing an acid group such as acrylic acid esters, styrene and the like, (iv) by reacting with phosphoric acid and water and the like or (v) by at least partially neutralizing of the reaction product of (i) to (iv) above with a base such as dimethanol amine For example, EP17911, U.S. Pat. No. 6,306,934 and WO2000039190, incorporated herein by reference, are references which describe the formation of water dispersible epoxy resins and rendering them into dispersions.

The resin of the present invention as such could further undergo additional processes such as hydrogenation of any unsaturations or aromatic moieties to yield a resin which is fully saturated.

The preparation of a high molecular weight epoxy resin of the present invention is achieved by adding to a reactor: a cycloaliphatic diglycidyl ether, an ortho-diphenol, optionally a catalyst, and optionally a solvent; and then allowing the components to react under reaction conditions to produce the advanced epoxy resin. The components may be mixed in any order. The components are heated until the desired degree of reaction is achieved.

The reaction conditions to form the substantially linear high molecular weight epoxy resin include carrying out the reaction under a temperature, generally in the range of from about 20° C. to about 250° C.; preferably from about 100° C. to about 250° C.; more preferably, from about 125° C. to about 225° C.; and most preferably, from about 150° C. to about 200° C. The pressure of the reaction generally may be from about 0.1 bar to about 10 bar; preferably, from about 0.5 bar to about 5 bar: and more preferably, from about 0.9 bar to about 1.1 bar.

In a preferred embodiment, one or more suitable reaction catalysts may be employed in the practice of the present invention. Catalysts used to prepare the compositions of the present invention may be selected, for example, from one or more of, metal salts such as an alkali metal salt or an alkaline earth metal salt, a tertiary amine, a quaternary ammonium salt, a quaternary phosphonium salt, a phosphine, and the like, and mixtures thereof. Preferably, the catalyst used in the present invention is tetrabutylphosphonium acetate-acetic acid complex, ethyltriphenylphosphonium acetate-acetic acid complex, or mixtures thereof.

The reaction catalyst is generally employed in an amount of from about 0.0010 wt % to about 10 wt %; from about 0.01 wt % to about 10 wt %; preferably from about 0.05 wt % to about 5 wt %, and most preferably from about 0.1 wt % to about 4 wt %, based on the combined weight of monomer compounds used.

The reaction process to prepare the substantially linear high molecular weight epoxy resin of the present invention may be a batch or a continuous. The reactor used in the process may be any reactor and ancillary equipment well known to those skilled in the art.

Another embodiment of the present invention is directed to a curable advanced epoxy resin coating composition comprising (i) the above advanced epoxy resin of Structure (I); (ii) at least one curing agent; (iii) optionally at least one curing catalyst; (iv) optionally, at least one solvent; and (v) optionally, at least one additive.

The first component (i) of the curable advanced epoxy resin coating composition comprises the advanced epoxy resin, as described above. The concentration of advanced epoxy resin used in the curable advanced epoxy resin mixture of the present invention may range generally from about 99.9 wt % to about 10 wt %; preferably, from about 99 wt % to about 50 wt %; more preferably from about 98 wt % to about 75 wt %; and even more preferably, from about 95 wt % to about 85 wt %. Generally, the amount of advanced epoxy resin used is selected based on the desired balance of properties of the resulting cured coating products.

A curing agent useful for the curable advanced epoxy resin composition of the present invention may comprise any conventional curing agent known in the art for curing epoxy resins such as for example an epoxy resin, a phenolic resole, an amino formaldehyde resin, an amido formaldehyde resin or an anhydride resin, and the like. The crosslinker may also be selected from crosslinkers with other reactive groups such as active alcoholic OH groups, e.g. alkylol such as ethylol or other methylol groups, epoxy group, carbodiimide group, isocyanate group, blocked isocyanate group, aziridinyl group, oxazoline group, acid groups and anhydride groups, i-butoxymethylacrylamide and n-butoxymethylacrylamide groups and the like, polyvalent phenolic compounds; unsaturated groups cured with a radical initiator and/or radiation, and mixtures thereof.

The ratios between the epoxy resin, component (i); and the crosslinker component (ii) of the curable epoxy resin composition, may vary depending on various factors such as the type of crosslinker used. However, in general the weight ratio may be from about 0.1 wt % to about 90 wt %, preferably from about 1 wt % to about 50 wt %, more preferably from about 2 wt % to about 25 wt %, and even more preferably from about 5 wt % to about 15 wt %. The amount of the curing agent used in the curable advanced epoxy resin composition generally is selected based on the desired balance of properties of the resulting cured product.

In preparing the curable advanced epoxy resin coating composition of the present invention, at least one curing catalyst may be used to facilitate the curing reaction of the advanced epoxy resin with the at least one curing agent. The curing catalyst useful in the present invention may include, for example an acid such as phosphoric acid or an organosulfonic acid or a base such as a tertiary amine or an organometallic compound such as organic derivative of tin, bismuth, zinc, or titanium or an inorganic compound such as oxide or halide of tin, iron, or manganese; and mixtures thereof.

The curing catalyst is generally employed in an amount of from about 0.01 wt % to about 10 wt %; preferably from about 0.05 wt % to about 5 wt %, most preferably from about 0.1 wt % to about 2 wt %, based on the combined weight of the advanced epoxy resin and curing agent used.

Also to facilitate the formation of a coating of the advanced epoxy resin with the at least one curing agent, a solvent may be used in preparing the curable advanced epoxy resin of the present invention. For example, one or more organic solvents well known in the art may be added to the advanced epoxy resin composition. For example, aromatics such as xylene, ketones such as methyl ethyl ketone and cyclohexanone, and ethers such as monobutyl ethylene glycol ether and diethylene glycol dimethyl ether (diglyme), alcohols such as butanols; and mixtures thereof, may be used in the present invention.

The concentration of the solvent used in the present invention may range generally from 0 wt % to about 90 wt %, preferably from about 0.01 wt % to about 80 wt %, more preferably from about 1 wt % to about 70 wt %, and most preferably from about 10 wt % to about 60 wt %. Viscosity is too high or solvent is wasted when the above concentration ranges are not used. However, it is possible to formulate the coating compositions without any solvent, such as for applications in power coatings.

Additives known useful for the preparation, storage, and curing of the advanced epoxy resin composition may be used as optional additional elements, such as reaction catalysts, resin stabilizers, defoamers, wetting agents, curing catalysts, pigments, dyes and processing aids. An assortment of additives may be optionally added to the compositions of the present invention including for example, catalysts, solvents, other resins, stabilizers, fillers such as pigments and dyes or corrosion inhibitors, plasticizers, catalyst de-activators, and mixtures thereof.

Other optional additives that may be added to the curable composition of the present invention may include, for example, wetting agents, lubricants, defoamers, fillers, adhesion promoters, slip agents, anti-cratering agents, plasticizers, catalyst de-activators, dispersion with acid functional/non ionic surfactants in water; and mixtures thereof and the like.

Other additional components to be part of the coating formulation may include polymeric coreactants such as an acrylic resin or polyester resin; resins such as polyesters, acrylic resins, polyolefins, urethane resins, alkyd resins, polyvinylacetates; and mixtures thereof and the like.

Generally, the concentration of the optional additive components used in the present invention may range from 0 wt % to about 90 wt %, preferably from about 0.01 wt % to about 70 wt %, more preferably from about 0.1 wt % to about 50 wt %, and most preferably from about 0.5 wt % to about 30 wt %. In other embodiments, the concentration of the optional additives may be generally from about 0.01 wt % to about 10 wt %, and preferably from about 1 wt % to about 5 wt %.

The curable advanced epoxy resin products used in the curable coating compositions of the present invention are preferably polymers with weight average molecular weight of generally between about 300 to about 1,000,000, preferably from about 1,000 to about 500,000, more preferably from about 2,000 to about 100,000, even more preferably from about 4,000 to about 50,000, still even more preferably from about 5,000 to about 40,000, and most preferably from about 7,000 to about 30,000.

The glass transition temperature of the curable advanced epoxy resin products used in the curable coating compositions of the present invention is generally between about −50° C. to about 200° C., preferably from about 0° C. to about 150° C., more preferably from about 10° C. to about 120° C., even more preferably from about 20° C. to about 100° C. and most preferably from about 25° C. to about 90° C.

The elongation at break of the curable advanced epoxy resin products used in the curable coating compositions of the present invention is generally between about 4 percent (%) to about 10000%, preferably from about 10% to about 5000%, more preferably from about 20% to about 2000%, even more preferably from about 30% to about 1500%, still even more preferably from about 40% to about 1200%, and most preferably from about 50% to about 1100%.

The tensile toughness of the curable advanced epoxy resin products used in the curable coating compositions of the present invention is generally between about 0.05 MPa to about 500 MPa, preferably from about 0.1 MPa to about 100 MPa, more preferably from about 0.5 MPa to about 50 MPa, even more preferably from about 0.8 MPa to about 30 MPa, and most preferably from about from about 1 MPa to about 20 MPa.

The process to produce the cured advanced epoxy resin products of the present invention may be performed by gravity casting, vacuum casting, automatic pressure gelation (APG), vacuum pressure gelation (VPG), infusion, filament winding, lay up injection, transfer molding, prepreging, coating, such as roller coating, dip coating, spray coating and brush coating, and the like.

The curing reaction conditions include, for example, carrying out the reaction under a temperature, generally in the range of from about 0° C. to about 300° C.; preferably, from about 20° C. to about 250° C.; and more preferably, from about 100° C. to about 220° C.

The pressure of the curing reaction may be carried out, for example, at a pressure of generally from about 0.01 bar to about 1000 bar; preferably, from about 0.1 bar to about 100 bar; and more preferably, from about 0.5 bar to about 10 bar.

The curing of the curable advanced epoxy resin coating composition may be carried out, for example, for a predetermined period of time sufficient to cure or partially cure (B-stage) the composition. For example, the curing time may be chosen generally between about 2 seconds to about 24 hours, preferably from about 5 seconds to about 2 hours, more preferably from about 5 seconds to about 30 minutes, and even more preferably from about 8 seconds to about 15 minutes. A B-staged composition of the present invention may then be completely cured at a later time using the aforementioned conditions.

The curing process of the present invention may be a batch or a continuous process. The reactor used in the process may be any reactor and ancillary equipment well known to those skilled in the art.

The resulting cured coating composition displays excellent physical-mechanical properties, such as unusually high flexibility, good retort resistance and excellent adhesion before and after retorting processes, good organic solvent resistance and good visual blush appearance useful for metal food packaging applications.

The flexibility of the cured coating composition was measured by Wedge Bend Flexibility. The failure percentage measured by Wedge Bend Flexibility of the resulting cured coating composition is generally below about 50%, preferably below about 25%, more preferably below about 15%, even more preferably below about 10%, still even more preferably below about 5%, yet even more preferably below about 4%, still even more preferably below about 3%, yet even more preferably below about 2%, and most preferably below about 1%.

The chemical solvent resistance of the cured coating composition was measured by MEK Double Rub. The solvent resistance measured by MEK Double Rub of the resulting cured coating composition is generally above about 25, preferably above about 50, more preferably between about 50 to about 200, even more preferably between about 50 to about 150, and most preferably between about 50 to about 125.

The retort resistance and adhesion before and after retorting processes of the cured coating composition was characterized by retort resistance measurement in lactic acid solution. The retort resistance of the resulting cured coating composition preferably has a visual scale standard ranking of 5, which indicates that the resulting cured coating composition does not have any cracking, blushing, blisters and/or adhesion failure after the retort treatment.

The curable coating composition formulation or composition of the present invention can be cured under conventional processing conditions to form a film, a coating or a solid.

As an illustration of the present invention, in general, the resulting cured coatings are useful in applications, such as for example, encapsulations, castings, moldings, potting, encapsulations, injection, resin transfer moldings, composites, and the like.

In one embodiment, the coatings are useful for food and beverage containers. The resins can be further modified, such as acrylic grafted and modifications of functional groups along the polymer chains, prior to use. The coating compositions prepared therefrom can be applied to metal substrate and cured under mild heat curing conditions to provide smooth and highly flexible coatings. The novel coating compositions provide a method and a composition for a coating composition which shows unusually high flexibility, excellent adhesion to the metal before and after retorting processes and good visual blush appearance useful for metal food packaging applications. The present invention is particularly useful for internal protective coatings for cans as well as external protective coatings for cans such as washcoats, repair coats for scoring areas of easy open ends or welding zones, as corrosion protective base coat or as overprint varnish in decorative external coating systems.

EXAMPLES

The following examples and comparative examples further illustrate the present invention in detail but are not to be construed to limit the scope thereof.

Various terms and designations are used in the following Examples, including for example the following:

UNOXOL™ Diol is a mixture of cis-, trans-1,3- and 1,4-cyclohexane-dimethanol obtained from The Dow Chemical Company. A product mixture of a diglycidyl ether of cis-1,3-cyclohexanedimethanol, a diglycidyl ether of trans-1,3-cyclohexane-dimethanol, a diglycidyl ether of cis-1,4-cyclohexanedimethanol, a diglycidyl ether of trans-1,4-cyclohexanedimethanol (UNOXOL™ Diol DGE) was prepared and purified according to the method provided in Reference Example A.

Likewise, a product mixture of diglycidyl ether of cis-, trans-1,4-cyclohexanedimethanol (1,4-cis-, trans-CHDM DGE) was prepared and purified using the method provided in Reference Example A.

Methylon 75108 is an allyl ether phenol-based phenolic resin crosslinker obtained from Durez Corporation. Byk-310 is a silicone additive obtained from Byk Chemie. DER™ 669E is a bisphenol A based high molecular weight 9-type advanced epoxy resin product obtained from The Dow Chemical Company. Catalyst A2 is a 70% tetrabutylphosphonium acetate-acetic acid complex in methanol obtained from Deepwater Chemicals. Erisys™ GE-20 is a neopentyl glycol epoxy resin obtained from CVC Thermoset Specialties. A purified neopentyl glycol diglycidyl ether (DGE) was obtained from vacuum distillation of Erisys™ GE-20. All other chemicals were obtained from Sigma-Aldrich and used as received, except where otherwise noted.

Standard analytical equipment and methods are used in the following Examples and Comparative Examples, including the following:

Molecular Weight Measurement

Gel permeation chromatography (GPC) is used to measure the molecular weight and molecular weight distribution of advanced epoxy resins. The polymeric samples were diluted to about 0.25 wt % concentration with eluent and analyzed using the conditions below: columns: Polymer Labs 5 µm, 50 Å, 100 Å, 1000 Å, and 10000 Å mono-pore size columns (4 in series); detector: Viscotek TDA 302 with triple-detection system. Differential reflective index (DRI) detector was used for relative MW calculations; eluent: tetrahydrofuran; flow: 1 mL/min; temperature: 40° C.; injection: 100 µL; calibration: Polymer Laboratories PS-2 linear polystyrene with 3rd order fitting.

Glass Transition Temperature Measurement

Differential scanning calorimetry (DSC) is used to characterize the glass transition temperature (Tg) of thermoset advanced epoxy resins. The equipment used is a Q1000 DSC from TA Instruments and the testing conditions are two heating and one cooling scans between −50° C. and 250° C. at 10° C./min under nitrogen. The reported Tg was calculated from the second heating scan.

Microtensile Measurement

Tensile test is a common measurement used in the industry for many years to characterize toughness, elongation and the ability to resist failure under tensile stress. Stress-strain behavior of advanced epoxy resins is measured using ASTM D 1708 microtensile specimens. This microtensile test consists of pulling a sample of material until it breaks with an Instron™ at 20 mm/min at 21° C. with a 200 lb load cell with pneumatic grips. The specimens tested may have a rectangular cross section. From the load and elongation history, a stress-strain curve is obtained with the strain being plotted on the x-axis and stress on the y-axis. The elongation at break is defined as the strain at which the specimen breaks. The tensile toughness is defined as the area under the entire stress-strain curve up to the fracture point. Tensile toughness and elongation at break are reported from an average of 5 specimens.

Coating Thickness Measurements

The thickness measurements are performed—according to ASTM D 1186-93; "Non-destructive measurement of dry film thickness of non magnetic coatings applied to a ferrous base" using a PERMASCOPE D-211D, coating thickness gauge. The sample panel without any coating is zeroed in and then coated panels are measured using a probe for ferrous materials and the measured thickness is reported in micron (µm).

Methyl Ethyl Ketone (MEK) Double Rub Test

The MEK double rub test is performed according to ASTM D 5402. The flat end of a hammer hemispherical having a weight of two pounds is used. A normal cheese cloth "VILEDA 3168" is bound around the hammer end. It is soaked with MEK. The hammer is brought onto the coating and moved forth-and-back over the whole coating, being one double rub. Care is taken not to put any pressure on the hammer. After every 25 double rubs the tissue is re-soaked. This is repeated until the coating is rubbed off to such an extent that the coating is scratched. This procedure is carried out until the maximum of 200 rubs are reached.

Wedge Bend Flexibility Test

The wedge bend test is carried out as follows: A tapered 180 degree bend in the panel is formed by first bending it to 180° with a radius of about 0.5 cm and coating on the outside of the bend. Then one side of the bend was completely flattened to a near zero radius with an impactor at 40 in. lbs. The stressed surface is subjected to a tape pull and then rubbed with a solution of copper sulfate (mixture of 10 g of copper sulfate, 90 g of water and 3 g of sulfuric acid). Anywhere the coating has cracked dark spots appear indicating failure. The amount of coating failure (in mm) along the length of the wedge bend, which is 100 mm, is recorded as "% failure."

Retort Resistance in Lactic Acid Solution

Lactic acid retort resistance (LAR) test is carried out as follows: The coated and 180 bended panels were immersed in 2% lactic acid solution in water. The samples were loaded in an autoclave retorted at 121° C. for 30 minutes. Then the autoclave was cooled down to below 50° C. before opening. The panels were removed from the autoclave and the coatings were evaluated using a visual scale of 5-0 in which 5 is the best and 0 is the worst. The visual scale standards are: 5: no blush or blisters on bent or flat sections; 4: no blush or blisters on flat section; 3: blush but no blisters on flat section; 2: blush with small blisters on flat section; 1: blush with many large blisters on flat section and 0: total coating destruction.

Adhesion Test (After Retort Resistance)

The adhesion test was carried out as follows: Place the centre of a piece of tape over the coating area after the retort resistance measurement in 2% lactic acid solution. Within 30±10 seconds of application, remove the tape by seizing the free end and rapidly pulling it off at as close to an angle of 180 degrees as possible. Any sign of removal of coating by the tape indicates adhesion failure.

Reference Example A

Synthesis of Epoxy Resin of UNOXOL™ Diol

Epoxidation of UNOXOL™ Diol was performed using three stages of aqueous sodium hydroxide addition with post reaction at 40° C. followed by fractional vacuum distillation to separate the constituents of the epoxy resin.

Epoxidation Reaction

A 5 L, 4 neck, glass, round bottom reactor was charged with UNOXOL™ Diol (432.63 g, 3.0 moles, 6.0 hydroxyl eq), epichlorohydrin (1110.24 g, 12.0 moles, 2:1 epichlorohydrin:UNOXOL™ Diol hydroxyl eq ratio), toluene (2.5 L), and benzyltriethylammonium chloride (43.62 g, 0.1915 mole) in the indicated order. The reactor was additionally equipped with a condenser (maintained at 0° C.), a thermometer, a Claisen adaptor, an overhead nitrogen inlet (1 LPM $N_2$ used), and a stirrer assembly (Teflon™ paddle, glass shaft, variable speed motor). [Teflon™ fluorocarbon resin is a trademark of E.I. duPont de Nemours.] A controller monitored the temperature registered on the thermometer in the reactor and provided heating via the heating mantle placed under the reactor as well as cooling delivered by a pair of fans positioned on the reactor exterior. Sodium hydroxide (360.0 g, 9.0 moles) dissolved in DI water (360 g) for the initial addition was added to a side arm vented addition funnel, sealed with a ground glass stopper, then attached to the reactor. Stirring commenced to give a 22.5° C. mixture followed by commencement of dropwise addition of the aqueous sodium hydroxide solution. The reaction mixture was allowed to self-heat to 40° C. during the aqueous sodium hydroxide addition time and then held at that temperature via cooling from the fans as needed. Thus, after 196 minutes the reaction temperature first reached 40° C. and then remained at 39-40° C. for the remainder of the aqueous sodium hydroxide addition. Addition of the aqueous sodium hydroxide took a total of 233 minutes. Fourteen minutes after completion of the aqueous sodium hydroxide addition, heating commenced to maintain the reaction at 40° C. After 16.2 hours of postreaction at 40° C., stirring ceased, and the reactor contents were allowed to settle. The organic layer was decanted from the reactor followed by addition of 1.5 L of DI water to the salt and residual toluene left behind in the reactor. After addition into a 2 L separatory funnel and settling, the toluene layer which separated from the aqueous salt solution was recovered and combined back with the decanted organic layer. The aqueous layer was discarded as waste. GC analysis after normalization to remove solvents (acetonitrile and toluene) and unreacted epichlorohydrin revealed the presence of 2.21 area % light components, 1.27 area % unreacted cis-, trans-1,3- and 1,4-cyclohexanedimethanol; 43.13 area % monoglycidyl ethers, 0.25 area % of a pair of components associated with the diglycidyl ether peaks, 50.20 area % diglycidyl ethers, and 2.94 area % oligomers that were volatile under the conditions of the GC analysis.

The organic layer was reloaded into the reactor along with fresh benzyltriethylammonium chloride (21.81 g, 0.0958 mole). Sodium hydroxide (180 g, 4.5 moles) dissolved in DI water (180 g) was added to a side arm vented addition funnel, sealed with a ground glass stopper, then attached to the reactor. Stirring commenced to give a 23.5° C. mixture followed by commencement of dropwise addition of the aqueous sodium hydroxide solution. The reaction mixture was allowed to self-heat during the aqueous sodium hydroxide addition time. Thus, after 119 minutes 100% of the aqueous sodium hydroxide was added causing the reaction temperature to reach a maximum of 30.5° C. Three minutes after completion of the aqueous sodium hydroxide addition, heating commenced to bring the reaction to 40° C. after 11 minutes of heating. After 15.8 hours of postreaction at 40° C., stirring ceased, and the reactor contents were allowed to settle. The organic layer was decanted from the reactor followed by addition of 1.0 L of DI water to the salt and residual toluene left behind in the reactor. After addition into a 2 L separatory funnel and settling, the toluene layer which separated from the aqueous salt solution was recovered and combined back with the decanted organic layer. The aqueous layer was discarded as waste. GC analysis after normalization to remove solvents (acetonitrile and toluene) and unreacted epichlorohydrin revealed the presence of 5.62 area % light components, no detectable unreacted cis-, trans-1,3- and 1,4-cyclohexanedimethanol; 12.63 area % monoglycidyl ethers, 0.64 area % of a pair of components associated with the diglycidyl ether peaks, 76.30 area % diglycidyl ethers, and 4.81 area % oligomers that were volatile under the conditions of the GC analysis.

The organic layer was reloaded into the reactor along with fresh benzyltriethylammonium chloride (10.91 g, 0.0479 mole). Sodium hydroxide (90 g, 2.25 moles) dissolved in DI water (90 g) was added to a side arm vented addition funnel, sealed with a ground glass stopper, then attached to the reactor. Stirring commenced to give a 23° C. mixture followed by commencement of dropwise addition of the aqueous sodium hydroxide solution. The reaction mixture was allowed to self-heat during the aqueous sodium hydroxide addition time. Thus, after 50 minutes 66.67% of the aqueous sodium hydroxide was added causing the reaction temperature to reach a maximum of 24.5° C. This temperature was maintained for the remainder of the aqueous sodium hydroxide addition. Addition of the aqueous sodium hydroxide took a total of 61 minutes. Immediately after completion of the aqueous sodium hydroxide addition, heating commenced to bring the reaction to 40° C. after 22 minutes of heating. After 16.7 hours of postreaction at 40° C., stirring ceased, and the reactor contents were allowed to settle. The organic layer was decanted from the reactor followed by addition of 1.0 L of DI water to the salt and residual toluene left behind in the reactor. After addition into a 2 L separatory funnel and settling, the toluene layer which separated from the aqueous salt solution was recovered and combined back with the decanted organic layer. The aqueous layer was discarded as waste. GC analysis after normalization to remove solvents (acetonitrile and toluene) and unreacted epichlorohydrin revealed the presence of 8.62 area % light components, no detectable unreacted cis-, trans-1,3- and 1,4-cyclohexanedimethanol; 9.91 area % monoglycidyl ethers, 0.46 area % of a pair of components associated with the diglycidyl ether peaks, 75.29 area % diglycidyl ethers, and 5.72 area % oligomers that were volatile under the conditions of the GC analysis.

Epoxy Resin Product Isolation

After removal of the aqueous layer from the reaction with the third aqueous sodium hydroxide addition, the organic layer was equally split between the pair of separatory funnels and the contents of each respective separatory funnel then washed with DI water (400 mL) by vigorously shaking. The washed product was allowed to settle for 2 hours, then the aqueous layer was removed and discarded as waste. A second wash was completed using the aforementioned method, with settling overnight (20 hours) to fully resolve the organic and aqueous layers. The combined, hazy organic solution was filtered through a bed of anhydrous, granular sodium sulfate in a 600 mL fitted glass funnel providing a transparent filtrate.

Rotary evaporation of the filtrate using a maximum oil bath temperature of 100° C. to a final vacuum of 2.4 mm of Hg removed the bulk of the volatiles. A total of 712.20 g of light yellow colored, transparent liquid was recovered after completion of the rotary evaporation. GC analysis after normalization to remove solvent (acetonitrile) revealed the presence of 9.76 area % monoglycidyl ethers, 0.38 area % of a pair of components associated with the diglycidyl ether peaks, 82.39 area % diglycidyl ethers, and 7.47 area % oligomers that were volatile under the conditions of the GC analysis. Thus, GC analysis revealed that essentially all light boiling components, including residual epichlorohydrin, had been removed.

Fractional Vacuum Distillation

A portion (699.19 g) of the product from the rotary evaporation was added to a 1 L, 3 neck, glass, round bottom reactor equipped with magnetic stiffing and a thermometer for monitoring the pot temperature. A one piece integral vacuum jacketed Vigreux distillation column with distillation head was used. The distillation column nominally provided 9 to 18 theoretical plates depending on the mode of operation. A second section of jacketed Vigreux column was added between the one piece integral vacuum jacketed Vigreux distillation column with head and the reactor to provide an additional 9 to 18 theoretical plates. The distillation head was equipped with an overhead thermometer, air cooled condenser, a receiver and a vacuum takeoff. A vacuum pump was employed along with a liquid nitrogen trap and an in-line digital thermal conductivity vacuum gauge. Stirring commenced followed by application of full vacuum then progressively increased heating using a thermostatically controlled heating mantle. A clean receiver was used to collect each respective distillation cut. During the distillation, the initial distillation cuts were taken to sequentially remove all components boiling below the cyclohexanedimethanols, all unreacted cyclohexanedimethanols, and the bulk of the monoglycidyl ethers. Intermediate cuts removed various mixtures of monoglycidyl ethers and diglycidyl ethers. The final distillation cuts sought to selectively remove diglycidyl ether, with the final cut (270.5 g) providing a mixture comprising 0.11 area % monoglycidyl ethers, 0.48 area % of a pair of components associated with the diglycidyl ether peaks, 99.41 area % diglycidyl ethers, and no detectable oligomers. The oligomeric product (279.39 g) remained in the distillation pot.

Synthesis Example 1

Preparation of Epoxy Resin Comprising UNOXOL™ Diol DGE and Catechol

A mixture of 28.2 g of catechol, 70.9 g of UNOXOL™ Diol DGE and 303.8 g of diethylene glycol dimethyl ether (diglyme) was stirred and heated to 140° C. in a 500 mL 3-neck flask with a condenser and nitrogen purge. At 140° C., 2.1 g of Catalyst A2 was charged to the flask. The resulting mixture was further heated to 163° C. Polymerization of the reaction mixture was monitored by the titration of residual epoxy group in the reaction mixture. The reaction was stopped after 3.5 hours when 96% of epoxide was reacted. The resultant polymer solution was precipitated into 1500 mL of an ice and methanol mixture within a blender. The resulting polymer was collected, washed with methanol three times, and dried using a vacuum oven at 70° C. for 24 hours. The resulting polymer product was a light-yellow clear solid. The polymer product's glass transition temperature is 27° C. and the product's weight average molecular weight is 15350.

Synthesis Example 2

Preparation of Epoxy Resin Comprising 1,4-CHDM DGE and Catechol

A mixture of 12.2 g of catechol, 30.0 g of 1,4-CHDM DGE (Epoxy Equivalent Weight (EEW)=128.6, purity=99.0 area % by gas chromatography) and 129.3 g of diglyme was stirred and heated to 140° C. in a 250 mL 3-neck flask with a condenser and nitrogen purge. At 140° C., 0.9 g of Catalyst A2 was charged to the flask. The resulting mixture was further heated to 163° C. Polymerization of the reaction mixture was monitored by the titration of residual epoxy group in the reaction mixture. The reaction was stopped after 13 hours when 98.9% of epoxide was reacted. The resultant polymer solution was precipitated into 750 mL of an ice and methanol mixture within a blender. The resulting polymer was collected, washed with methanol three times, and dried using a vacuum oven at 70° C. for 24 hours. The resulting polymer product was a light-yellow clear solid. The polymer product's glass transition temperature is 31° C. and the weight average molecular weight is 27590.

Synthesis Example 3

Preparation of Epoxy Resin Comprising UNOXOL™ Diol DGE, Distilled Neopentyl Glycol DGE and Catechol A mixture of 15.00 g of catechol, 29.65 g of UNOXOL™ Diol DGE, 6.24 g of vacuum distilled neopentyl glycol DGE (EEW=108.7, purity=99.31 area % by gas chromatography) and 156.0 g of diglyme was stirred and heated to 140° C. in a 250 mL 3-neck flask with a condenser and nitrogen purge. At 140° C., 1.09 g of Catalyst A2 was charged to the flask. The resulting mixture was further heated to 163° C. Polymerization of the reaction mixture was monitored by the titration of residual epoxy group in the reaction mixture. The reaction was stopped after 4 hours when 96.9% of epoxide was reacted. The resultant polymer solution was precipitated into 750 mL of an ice and methanol mixture within a blender. The resulting polymer was collected, washed with methanol three times, and dried using a vacuum oven at 70° C. for 24 hours. The resulting polymer product was a light-yellow clear solid. The polymer product's glass transition temperature is 30° C. and the weight average molecular weight is 26689.

Comparative Synthesis Example A

Preparation of Epoxy Resin Comprising UNOXOL™ Diol DGE and Resorcinol

A mixture of 16.0 g of resorcinol, 41.1 g of UNOXOL™ Diol DGE and 173.7 g of diglyme was stirred and heated to 140° C. in a 250 mL 3-neck flask with a condenser and nitrogen purge. At 140° C., 1.2 g of Catalyst A2 was charged to the flask. The resulting mixture was further heated to 163° C. Polymerization of the reaction mixture was monitored by the titration of residual epoxy group in the reaction mixture. The reaction was stopped after 3.6 hours when 94.6% of epoxide was reacted. The resultant polymer solution was precipitated into 1500 mL of an ice and methanol mixture within a blender. The resulting polymer was collected, washed with methanol three times, and dried using a vacuum oven at 70° C. for 24 hours. The resulting polymer product was a light-yellow clear solid. The polymer product's glass transition temperature is 25.8° C. and its weight average molecular weight was measured to be 21650.

Comparative Synthesis Example B

Preparation of Epoxy Resin Comprising UNOXOL™ Diol DGE and Hydroquinone

A mixture of 28.2 g of hydroquinone, 70.9 g of UNOXOL™ Diol DGE and 303.8 g of diglyme was stirred and heated to 140° C. in a 500 mL 3-neck flask with a condenser and nitrogen purge. At 140° C., 2.1 g of Catalyst A2 was charged to the flask. The resulting mixture was further heated to 163° C. Polymerization of the reaction mixture was monitored by the titration of residual epoxy group in the reaction mixture. The reaction was stopped after 2 hours when 97.3% of epoxide was reacted. The resultant polymer solution was precipitated into 1500 mL of an ice and methanol mixture within a blender. The resulting polymer was collected, washed with methanol three times, and dried using a vacuum oven at 70° C. for 24 hours. The resulting polymer product was a light-yellow clear solid. The polymer product's glass transition temperature is 32.8° C. and its weight average molecular weight was measured to be 25850.

Comparative Synthesis Example C

Preparation of Epoxy Resin Comprising UNOXOL™ Diol DGE and Bisphenol A

A mixture of 20.0 g of bisphenol A, 24.4 g of UNOXOL™ Diol DGE and 136.2 g of diglyme was stirred and heated to 140° C. in a 250 mL 3-neck flask with a condenser and nitrogen purge. At 140° C., 0.95 g of Catalyst A2 was charged to the flask. The resulting mixture was further heated to 163° C. Polymerization of the reaction mixture was monitored by the titration of residual epoxy group in the reaction mixture. The reaction was stopped after 2.6 hours when 96.1% of epoxide was reacted. The resultant polymer solution was precipitated into 750 mL of an ice and methanol mixture within a blender. The resulting polymer was collected, washed with methanol three times, and dried using a vacuum oven at 70° C. for 24 hours. The resulting polymer product was a light-yellow clear solid. The polymer product's glass transition temperature is 44.2° C. and its weight average molecular weight was measured to be 22850.

Comparative Example D

Commercial Resin

For comparison, a commercially available substantially linear high molecular weight epoxy resin, DER™ 669E, was measured by DSC and GPC for its Tg and molecular weight. The glass transition temperature of this bisphenol A based 9-type epoxy resin is 88.3° C. and its weight average molecular weight is 17450. The results indicate that our new epoxy resins, Example 1, 2 and Comparative Example A-C, have similar weight average molecular weight as the bisphenol A based DER™ 669E, the commercially available high molecular weight epoxy resin.

The material flexibility and toughness were characterized by Stress-strain behavior under microtensile measurement according to ASTM D 1708. Elongation at break is a parameter to measure the flexibility of polymeric materials and tensile toughness is a measure of the ability of a material to absorb energy in a tensile deformation. The microtensile results of new epoxy resins, Example 1, 2 and Comparative Example A-C, are shown in Table I, in comparison with Comparative Example D: DER™ 669E, the bisphenol A based 9-type high molecular weight epoxy resin. The elongations to break of the epoxy resins of the present invention are about 80 times to over 1000 times higher than DER™ 669E and their tensile toughness are over 100 times stronger than DER™ 669E. The data in Table I show that the high molecular weight epoxy resins of the present invention are more flexible and tough than the 9-type the bisphenol A based epoxy resin, although their weight average molecular weights are in a similar range.

TABLE I

Microtensile Results of Epoxy Resins

| Sample # | Elongation to Break (%) | tensile toughness (Mpa) |
|---|---|---|
| Synthesis Example 1 | 617 | 6.66 |
| Synthesis Example 2 | 1088 | 7.33 |
| Comparative Synthesis Example A | 911 | 5.40 |
| Comparative Synthesis Example B | 553 | 11.76 |
| Comparative Synthesis Example C | 52 | 5.05 |
| Comparative Example D: DER ™ 669E | 0.67 | 0.03 |

Example 4

Curable Composition and Coating Made from Epoxy Resin of Synthesis Example 1

A mixture of 10.000 g of epoxy resin from Example 1, 1.111 g of phenolic crosslinker (Methylon 75108), 0.016 g of catalyst (85% phosphoric acid), 0.013 g of additive (BYK-310), 26.666 g of monobutyl ethylene glycol ether and 6.667 g of cyclohexanone was agitated for 16 hours forming a clear solution. The clear solution was filtered through a 1-micron syringe filter and then coated on tin free steel (TFS) panels with a #20 draw down bar. The panels with coatings were dried and cured in an oven at 205° C. for 15 minutes. The thickness of the cured coating is 5.0 micron.

Example 5

Curable Composition and Coating Made from Epoxy Resin of Synthesis Example 2

A mixture of 10.000 g of epoxy resin from Example 2, 1.111 g of phenolic crosslinker (Methylon 75108), 0.028 g of catalyst (85% phosphoric acid), 0.013 g of additive (BYK-310), 26.666 g of monobutyl ethylene glycol ether and 6.667 g of cyclohexanone was agitated for 16 hours. The clear solution was filtered through a 1-micron syringe filter and then coated on tin free steel (TFS) panels with a #20 draw down bar. The panels with coatings were dried and cured in an oven at 205° C. for 10 minutes. The thickness of the cured coating is 5.2 micron.

Example 6

Curable Composition and Coating Made from Epoxy Resin of Synthesis Example 3

A mixture of 10.000 g of epoxy resin from Example 3, 1.111 g of phenolic crosslinker (Methylon 75108), 0.028 g of catalyst (85% phosphoric acid), 0.013 g of additive (BYK-310), 26.666 g of monobutyl ethylene glycol ether and 6.667 g of cyclohexanone was agitated for 16 hours. The clear solution was filtered through a 1-micron syringe filter and then coated on tin free steel (TFS) panels with a #20 draw down bar. The panels with coatings were dried and cured in an oven at 205° C. for 15 minutes. The thickness of the cured coating is 5.3 micron.

Comparative Example E

Curable Composition and Coating Made from Epoxy Resin of Comparative Synthesis Example A A mixture of 10.000 g of epoxy resin from Comparative Example A, 1.111 g of phenolic crosslinker (Methylon 75108), 0.016 g of catalyst (85% phosphoric acid), 0.013 g of additive (BYK-310), 26.666 g of monobutyl ethylene glycol ether and 6.667 g of cyclohexanone was agitated for 16 hours. The clear solution was filtered through a 1-micron syringe filter and then coated on tin free steel (TFS) panels with a #20 draw down bar. The panels with coatings were dried and cured in an oven at 205° C. for 15 minutes. The thickness of the cured coating is 4.8 micron.

Comparative Example F

Curable Composition and Coating Made from Epoxy Resin of Comparative Synthesis Example B A mixture of 10.000 g of epoxy resin from Comparative Example B, 1.111 g of phenolic crosslinker (Methylon 75108), 0.016 g of catalyst (85% phosphoric acid), 0.013 g of additive (BYK-310), 26.666 g of monobutyl ethylene glycol ether and 6.667 g of cyclohexanone was agitated for 16 hours. The clear solution was filtered through a 1-micron syringe filter and then coated on tin free steel (TFS) panels with a #20 draw down bar. The panels with coatings were dried and cured in an oven at 205° C. for 10 minutes. The thickness of the cured coating is 4.6 micron.

Comparative Example G

Curable Composition and Coating Made from Epoxy Resin of Comparative Synthesis Example C A mixture of 10.000 g of epoxy resin from Comparative Example C, 1.111 g of phenolic crosslinker (Methylon 75108), 0.016 g of catalyst (85% phosphoric acid), 0.013 g of additive (BYK-310), 26.666 g of monobutyl ethylene glycol ether and 6.667 g of cyclohexanone was agitated for 16 hours. The clear solution was filtered through a 1-micron syringe filter and then coated on tin free steel (TFS) panels with a #20 draw down bar. The panels with coatings were dried and cured in an oven at 205° C. for 10 minutes. The thickness of the cured coating is 4.6 micron.

Comparative Example H

Curable Composition and Coating Made from DER™ 669E

A mixture of 10.000 g of DER™ 669E, 1.111 g of phenolic crosslinker (Methylon 75108), 0.016 g of catalyst (85% phosphoric acid), 0.013 g of surfactant (BYK-310), 26.666 g of monobutyl ethylene glycol ether and 6.667 g of cyclohexanone was agitated for 16 hours. The clear solution was filtered through a 1-micron syringe filter and then coated on tin free steel (TFS) panels with a #20 draw down bar. The panels with coatings were dried and cured in an oven at 205° C. for 15 minutes. The thickness of the cured coating is 5.0 micron.

All epoxy coatings from Examples 3-4 and Comparative Examples E-H are based on the similar coating formulations, except that different epoxy resins are used. All cured coatings are smooth and uniform without visual blush appearance. The flexibility of the cured coatings was evaluated by wedge bend measurement and the chemical resistance of the coatings was tested by MEK double rub tests. The retort resistance and coating adhesion was evaluated as well. The coating evaluation results of all cured epoxy coatings are shown in Table II.

TABLE II

Coating Evaluation Results

| Coating # | Wedge Bend (failure %) | MEK Double Rub | Retort Resistance | Adhesion |
|---|---|---|---|---|
| Example 4 | 0 | 50 | 5 | pass |
| Example 5 | 0 | 75 | 5 | pass |
| Example 6 | 0 | 50 | 5 | pass |
| Comparative Example E | 0 | 125 | 2 | fail |
| Comparative Example F | 0 | 50 | 0 | fail |
| Comparative Example G | 0 | 50 | 3 | pass |
| Comparative Example H | 25 | 75 | 5 | pass |

Wedge bend flexibility results indicate there was not any cracking and failure in the stressed coating surfaces from coatings based on the inventive epoxy resins (Examples 4, 5 and 6). The same is true of Comparative Examples E-G which are also based on advanced resins derived from cycloaliphatic epoxy but not of Comparative Example H based on 9-type high molecular weight DER™ 669E epoxy resin which showed 25% failure. However, not all coatings based on high molecular weight epoxy resins from cycloaliphatic diglycidyl ether provide good retort resistance and adhesion to the metal substrates. Examples 3 and 4 show that the cured coatings comprising high molecular weight epoxy resins prepared from catechol (ortho-diphenol) and cyclohexanedimethanol diglycidyl ether, such as UNOXOL™ Diol DGE and 1,4-CHDM DGE, have excellent retort resistance and maintain their integrity after tape adhesion measurement. In addition, Examples 5 shows that the cured coatings comprising high molecular weight epoxy resins prepared from catechol (ortho-diphenol) and diglycidyl ether mixture comprising high purity neopentyl glycol diglycidyl ether and cyclohexanedimethanol diglycidyl ether, such as UNOXOL™ Diol DGE and 1,4-CHDM DGE, also have excellent retort resistance and maintain their integrity after tape adhesion measurement. In comparison, Comparative Example E-G, the coatings based on high molecular weight epoxy resins prepared from UNOXOL™ Diol DGE and resorcinol (1,3-diphenol), hydroquinone (1,4-diphenol), and bisphenol A, respectively, provide poor retort resistance. In addition, the coatings based on high molecular weight epoxy resins prepared from UNOXOL™ Diol DGE and resorcinol (1,3-diphenol) or hydroquinone (1,4-diphenol), respectively, (Comparative Example E-F) were damaged and failed the tape adhesion measurement. And, the MEK double rub results illustrate that the cured coatings based on the epoxy resins of the present invention provide similar solvent resistance to the coatings based on conventional high molecular weight epoxy resin.

Synthesis Example 7

Preparation of Epoxy Resin Comprising 1,4-CHDM DGE and 2,3-dihydroxynathphanlene A mixture of 55.0 g of 2,3-dihydroxynathphanlene, 94.68 g of 1,4-CHDM DGE (purity=99.6 area % by gas chromatography) and 150.96 g of diglyme was stirred and heated to 130° C. in a 500 mL 4-neck flask with a condenser and nitrogen purge and a mechanic stirrer. At 131° C., 1.28 g of Catalyst ethyltriphenylphosphonium iodide was charged to the flask. The resulting mixture was further heated to 165° C. Polymerization of the reaction mixture was monitored by the titration of residual epoxy group in the reaction mixture. The reaction was stopped after 4.5 hours when 96.7% of the epoxide was reacted. The resultant polymer solution was precipitated into 500 mL of methanol contained in a blender. The resulting polymer was collected, washed with methanol three times, and dried using a vacuum oven at 60° C. for 24 hours. The resulting polymer product was a white clear solid. The polymer product's glass transition temperature is 64° C., the weight average molecular weight is 17381, the OH# is 260 mgKOH/g, and melt viscosity at 150° C. is 32888 cps.

Synthesis Example 8

Preparation of Epoxy Resin Comprising UNOXOL™ DGE and Catechol (Melt Process)

A mixture of 40 g of catechol, 100.16 g of UNOXOL™ DGE was stirred and heated to 100° C. in a 500 mL jacketed cylinder flask with 4-neck containing flange with a condenser and nitrogen purge and a mechanic stirrer. At 100° C., 0.30 g of Catalyst ethyltriphenylphosphonium acetate (70% solution in methanol containing about 1% acetic acid and 1% of methyl acetate) was charged to the flask. The resulting mixture was further heated to 125° C. during 20 min then to 145° C. during 15 min and finally to 155° C. during 10 min. The reaction was kept at 155° C. for 1 hr and stopped when 94.7% of the epoxide was reacted. Polymerization of the reaction mixture was monitored by the titration of residual epoxy group in the reaction mixture. The resultant polymer was poured out and collected. The resulting polymer product was a light-yellow clear solid. The polymer product's glass transition temperature is 28.5° C., the weight average molecular weight is 44046, the OH# is 242 mgKOH/g, and melt viscosity at 150° C. is 659902 cps.

Example 9

Coating of Epoxy Resin from Example 7

A mixture of 3.97 g epoxy resin from Example 4, 0.5 g phenolics crosslinker (Methylon 75108), 0.189 g of catalyst (10% phosphoric acid aqueous solution), 0.045 g of additive (BYK-310), 15.4 g of monobutyl ethylene glycol ether and cyclohexanone mixture (80/20 ratio by weight) was agitated overnight to form a clear solution. The clear solution was filtered through a 1 μm syringe filter and then coated on electrolytically tin plated steel (ETP) panels with a #22 wire wound rod drawdown bar. The coated panels were dried and cured in an oven at 205° C. for 10 minutes. The thickness of the cured coating is 6.4 μm.

Example 10

Coating of Epoxy Resin from Example 8

A mixture of 3.97 g epoxy resin from Example 5, 0.5 g phenolics crosslinker (Methylon 75108), 0.225 g of catalyst (10% phosphoric acid aqueous solution), 0.022 g of additive (BYK-310), 15.28 g of monobutyl ethylene glycol ether and cyclohexanone mixture (80/20 ratio by weight) was agitated overnight to form a clear solution. The clear solution was filtered through a 1 μm syringe filter and then coated on electrolytically tin plated steel (ETP) panels with a #22 wire wound rod drawdown bar. The coated panels were dried and cured in an oven at 205° C. for 10 minutes. The thickness of the cured coating is 4.3 μm.

Properties for the coatings are shown in the table below:

| Coating # | Wedge Bend (failure %) | MEK Double Rub | Retort Resistance | Adhesion |
| --- | --- | --- | --- | --- |
| Example 9 | 4 | 140 | 3 | fail |
| Example 10 | 0 | 200 | 4 | pass |

The coating performance results demonstrate that it has been found that cycloaliphatic diglycidyl ether compounds and catechol can be successfully used to make a substantially linear high molecular weight epoxy resin product, which have a high level of elongation at break and high tensile toughness and can be advantageously used in various coating applications such as for making can coatings, which show unusually and high flexibility, good retort resistance, excellent adhesion to the metal before and after retorting processes and good visual blush appearance useful for metal food packaging applications.

What is claimed is:

1. A curable coating composition comprising an epoxy resin polymeric composition and a crosslinking agent; wherein the epoxy resin polymeric composition comprises a reaction product of: (a) a cycloaliphatic diglycidyl ether compound comprising a mixture of a diglycidyl ether of cis-1,3-cyclohexanedimethanol, a diglycidyl ether of trans-1,3-cyclohexanedimethanol, a diglycidyl ether of cis-1,4-cyclohexanedimethanol, and a diglycidyl ether of trans-1,4-cyclohexanedimethanol; and (b) catechol; wherein the epoxy resin polymeric composition is represented by the following chemical structure:

Structure (I)

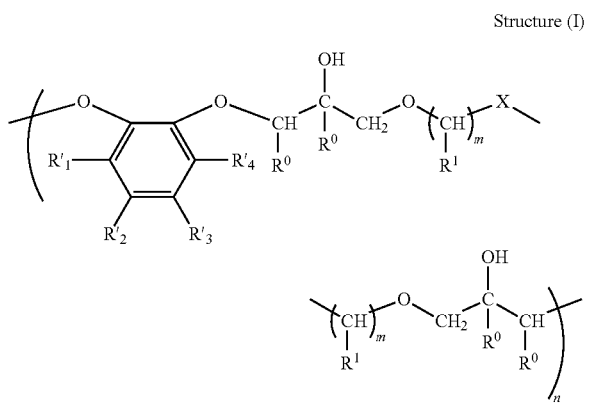

where n is a number from 1 to about 3000; each m has a value of 1; each $R^0$ is hydrogen; each $R^1$ is hydrogen; $R'_1$-$R'_4$ are hydrogen; and X is a cyclohexylene group.

2. The curable coating composition of claim 1 further comprising a curing catalyst.

3. The curable coating composition of claim 1, wherein the epoxy resin polymeric composition has a weight average molecular weight of from about 300 to about 1,000,000.

4. The curable coating composition of claim 1, wherein the epoxy resin polymeric composition has an elongation to break at about 21° C. of from about 4 percent to about 10000 percent as measured by the method ASTM D1708.

5. The curable coating composition of claim 1, wherein the epoxy resin polymeric composition has a tensile toughness at about 21° C. of from about 0.05 MPa to about 500 Mpa as measured by the method ASTM D1708.

6. The curable coating composition of claim 1, wherein the epoxy resin polymeric composition has a glass transition temperature of from about −50° C. to about 200° C.

7. The curable coating composition of claim 1 further comprising a solvent.

8. The curable coating composition of claim 1 further comprising a solvent and a curing catalyst.

9. A cured coating comprising the cured coating composition of claim 1.

10. A metal packaging coated with the cured coating of claim 9.

11. A can comprising an internal or external protective coating comprising the cured coating of claim 9.

12. An article comprising the composition of claim 1.

13. A process for preparing a coated article comprising the steps of (a) providing the curable coating composition of claim 1; (b) applying the curable coating composition of claim 1 to a metal substrate; and (c) heat curing the coating composition and substrate at a temperature of from about 0° C. to about 300° C.

14. A curable coating composition comprising a water-dispersible epoxy resin polymeric composition and a crosslinking agent; wherein the water-dispersible epoxy resin polymeric composition is formed by modifying an epoxy resin polymeric composition, rendering the epoxy resin polymeric composition water-dispersible; wherein the epoxy resin polymeric composition comprises a reaction product of: (a) a cycloaliphatic diglycidyl ether compound comprising a mixture of a diglycidyl ether of cis-1,3-cyclohexanedimethanol, a diglycidyl ether of trans-1,3-cyclohexanedimethanol, a diglycidyl ether of cis-1,4-cyclohexanedimethanol, and a diglycidyl ether of trans-1,4-cyclohexanedimethanol; and (b) catechol; wherein the epoxy resin polymeric composition is represented by the following chemical structure:

Structure (I)

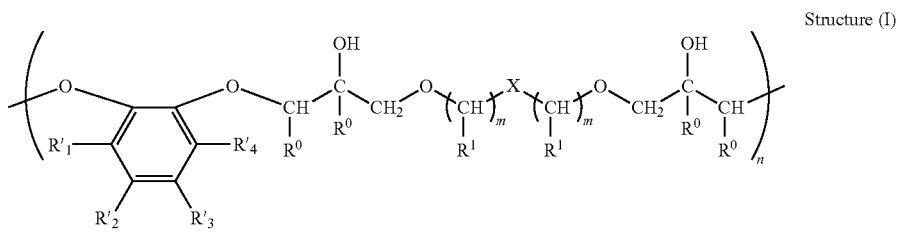

where n is a number from 1 to about 3000; each m has a value of 1; each $R^0$ is hydrogen; each $R^1$ is hydrogen; $R'_1$-$R'_4$ are hydrogen; and X is a cyclohexylene group.

15. The curable coating composition of claim 14, wherein the epoxy resin polymeric composition is rendered water-dispersible by a modification selected from: (i) reacting with a water-dispersible acrylic; (ii) reacting with a water-dispersible polyester resin; (iii) grafting with at least one acid monomer which contains a double bond which is polymerizable by free radical mechanism; (iv) grafting with at least one acid monomer which contains a double bond which is polymerizable by free radical mechanism and a vinylic monomer not containing an acid group; (v) reacting with a phosphoric acid and water; and (vi) at least partially neutralizing a product of (i) to (v) with a base.

* * * * *